Aug. 31, 1965  R. E. FLEMING ETAL  3,203,047

DIE CLAMPING SYSTEM

Filed Dec. 21, 1962  3 Sheets-Sheet 1

United States Patent Office 3,203,047
Patented Aug. 31, 1965

3,203,047
DIE CLAMPING SYSTEM
Raymond E. Fleming, Philadelphia, and Herman E. Reichert, Willow Grove, Pa., assignors to Jennings Machine Corporation, Philadelphia, Pa., a corporation of Pennsylvania
Filed Dec. 21, 1962, Ser. No. 246,500
9 Claims. (Cl. 18—13)

This invention relates to a die clamping system, and has for an object the provision of an improved clamping system for the die of extrusion equipment.

In extrusion equipment such for example, as the type for extruding a plastic coating around a wire, it is necessary to create and maintain a positive mechanical seal between the master die of a die head assembly and a cylinder liner of the cylinder assembly. The forces of extrusion pressure to be restrained in order to maintain such a seal are in the range of 8000 to 15,000 p.s.i. In extrusion equipment of this type, the die head assembly is quite heavy, and in view of the high extrusion pressures involved, it is necessary that the clamping system for such die be of rugged construction. While various forms of die clamping arrangements have been used herebefore, they have left something to be desired particularly in the way of ease of operation. The present invention overcomes the foregoing difficulties and provides an improved die clamping system which is easily and quickly operated.

In accordance with one aspect of the invention, there is provided a system for clamping the die of extrusion equipment comprising cylinder means adapted to receive the material to be extruded and die head means. The interior of the die head means and the exterior of the cylinder means have threaded areas adapted for engagement with each other. A handle means is provided on the die head means for manually tightening the die head threads with respect to the threads of the cylinder means. A gear means is disposed on the outer circumference of the die head means adjacent the threaded area. A pinion means is supported on the cylinder means, the pinion means having teeth adapted for engagement with the teeth of the gear means. A ratchet means is connected to the pinion means for rotation of the pinion means to drive the gear means in reverse directions as required to finally tighten the die head means with respect to the cylinder means and to initially loosen said die head means with respect to said cylinder means. In a preferred form of the invention, the ratchet means is actuated by a suitable power means, such for example as an air cylinder, and valve means is provided for controlling the reciprocation of the air cylinder to actuate the ratchet means.

For more detailed disclosure of the invention, and for further objects and advantages thereof, reference is to be had to the following description taken in conjunction with the accompanying drawings in which.

Figure 1:
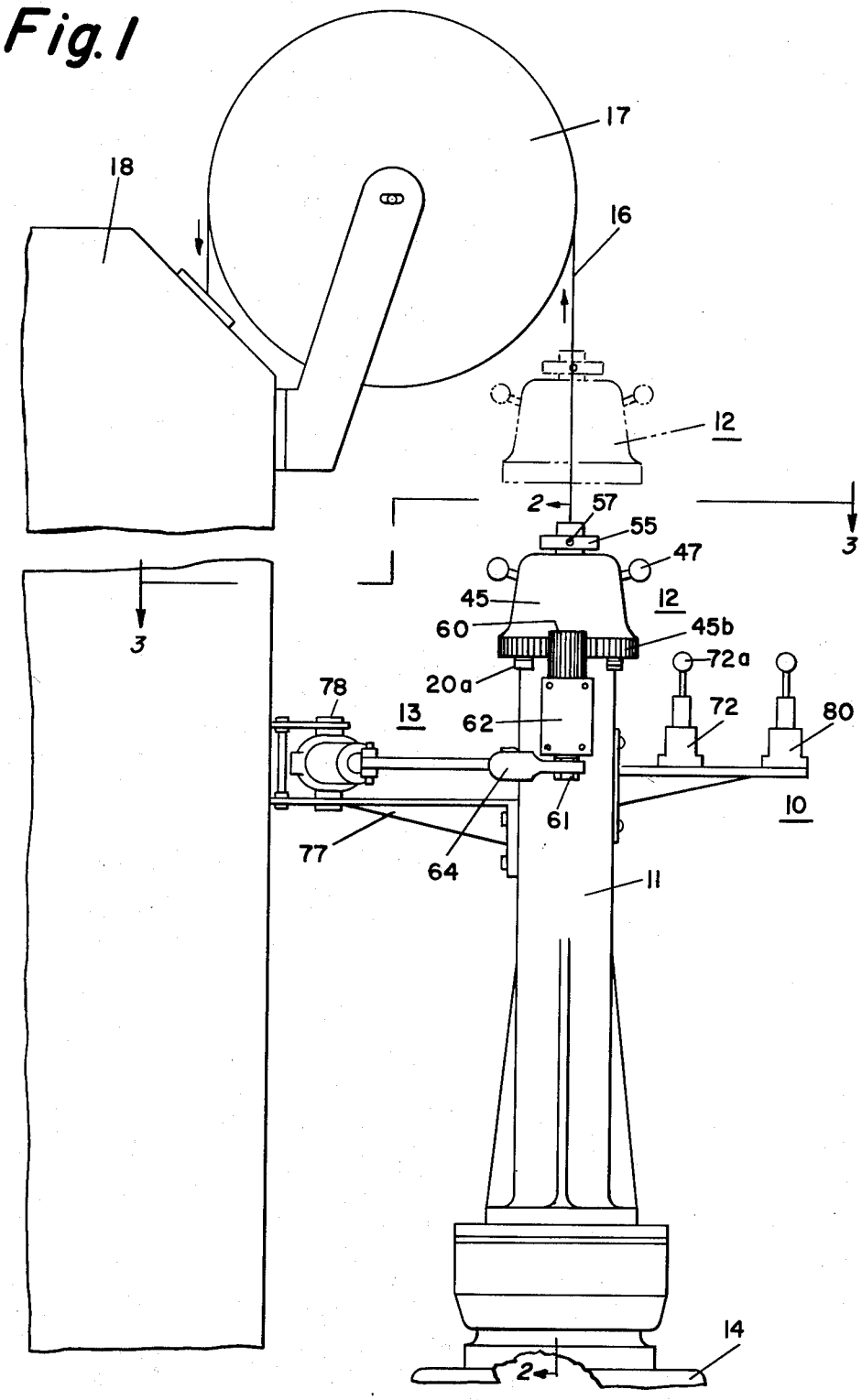
FIG. 1 is a front elevational view of extrusion equipment embodying the present invention.

Referring to FIG. 1, the invention has been illustrated and will be described in connection with extrusion equipment for putting a plastic coating such as polytetrafluoroethylene (Teflon) on wire. The Teflon in the form of a preform is placed into the cylinder chamber of the cylinder assembly 11 beneath the die head assembly 12. The die head assembly 12 is locked in place relative to the cylinder assembly 11 by means of a die locking assembly 13, as later to be described more in detail. The die cylinder 11 is carried by a base 14 beneath which is positioned a supply of bare wire (not shown) which is to be coated with Teflon. By means of pressure applied to the bottom of the preform, the Teflon is caused to adhere to the surface of the wire 16 which is concurrently being drawn through the die head assembly from the bottom of the cylinder assembly 11. The coated wire 16 then passes over a pulley 17 into adjacent ovens 18 where it is heated, sintered and dried. The ovens 18 are maintained at different predetermined temperatures to accomplish the foregoing in a manner well known in the art.

Figure 2:
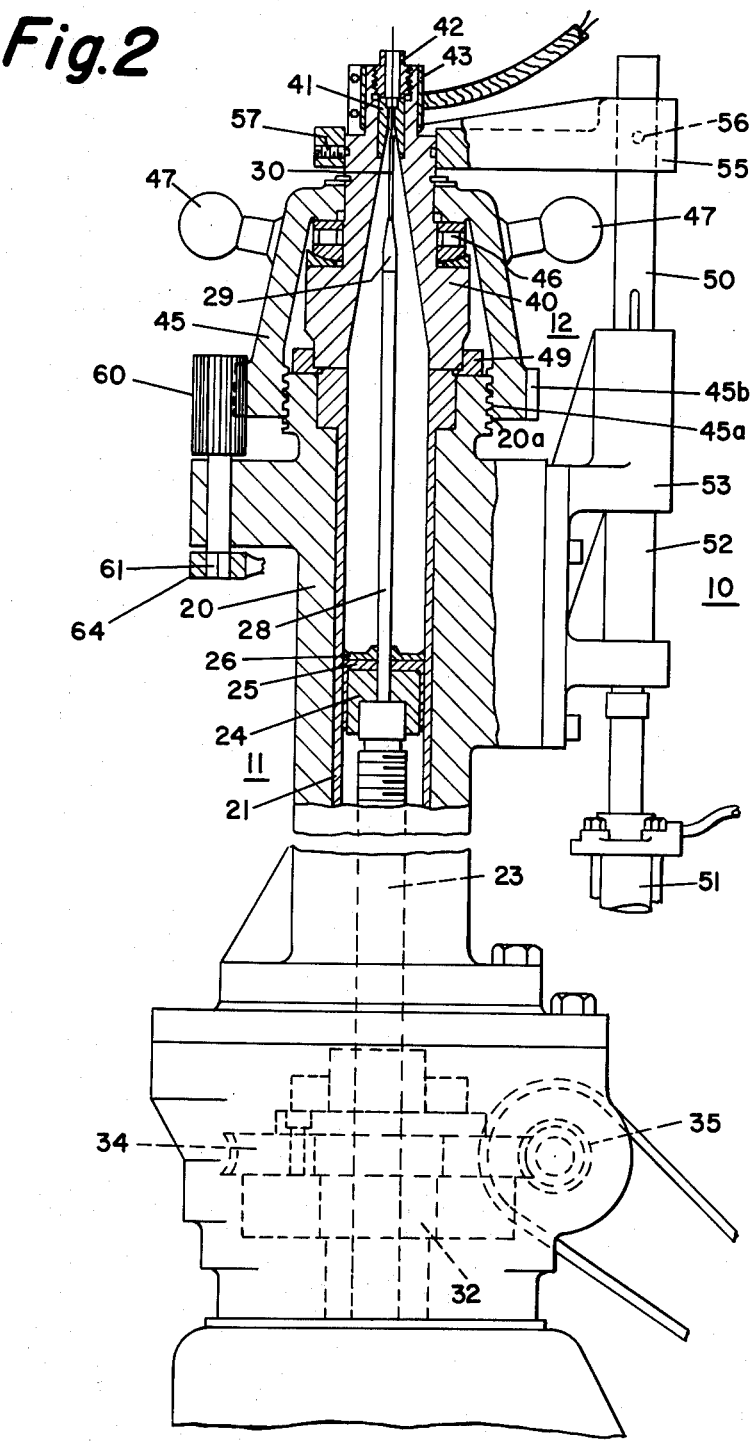
FIG. 2 is a view on enlarged scale partly in section and taken from the right hand side of FIG. 1, showing the die head and cylinder assemblies.

Referring to FIG. 2, the parts of the die head assembly 12 and the cylinder assembly 11 and the manner in which they cooperate are shown more in detail. The cylinder assembly 11 includes an outer cylinder 20 having an inner liner 21. Extending upwardly into the inner liner 21 is a ram or extrusion screw 23. The extrusion screw 23 is provided at its upper end with a steel cap 24 which is disposed within a bronze cap 25, the latter supporting a seal cup 26 which engages the lower end of a preform of Teflon (not shown) within the cylinder liner 21. Extending through the upper end of the extrusion screw 23 and through the preform within the cylinder chamber 21 is a hollow guide tube 28, having at its upper end a guide tube tip 29 and a hypodermic needle 30 through which the wire to be coated extends.

The lower end of the extrusion screw 23 is provided with threads which are adopted to mate with the threads of a revolving nut 32, which is supported for rotation in a bearing. The revolving nut 32 is secured to a worm gear 34 which meshes with a worm 35, the latter being driven from a suitable source of power, such for example, as an electric motor, not shown. As the worm 35 rotates, it in turn rotates the worm gear 34 which in turn rotates the revolving nut 32. This causes the extrusion screw 23 to move lengthwise of the cylinder 20 forcing the preform upwardly and causing the plastic material to be extruded about the wire. While the extrusion screw 23 is adapted for longitudinal movement, it is prevented from rotational movement by way of a key, not shown.

As may be seen in FIG. 2 the die head assembly 12 comprises a master die 40 having a cavity which is adapted to receive the preform. A die 41 is held in place at the upper end of the master die 40 by means of a lock screw 42. A band heater 43 extends around the upper end of the master die 40 and the die 42 for controlling the temperature of these parts during the extrusion operation. The heater 43 may be of any suitable type. Also forming part of the die head assembly 12 is a die clamp 45 which is supported on the master die 40 by a thrust bearing 46. The die clamp 45 is a cup shaped member and may be rotated relative to the master die 40 by means of handles 47. As mentioned above, the die clamp 45 is a cup shaped member and adjacent the lower end or lip thereof, the inner surface is provided with a threaded area 45a which is adapted to engage a corresponding threaded area 20a on the upper end of cylinder 20. The end of cylinder 20 is also provided with a precision guide ring 49 for locating the lower end of master die 40 relative to the upper end of cylinder liner 21. As pointed out above it is these two parts which must be maintained in positive mechanical sealing relation during the extrusion operation where pressures within the range of 8000 to 15,000 p.s.i. are reached.

Since the die head assembly 12 is relatively heavy, provision is made for raising and lowering it automatically relative to the cylinder assembly 11. This is accomplished by means of a movable support rod 50, which is adapted to be raised or lowered by means of a pressure cylinder 51 which may either be of the air or liquid type.

The support rod 50 is adapted to reciprocate within a bushing 52 carried by a clamp bracket 53, the latter being secured to the side of the cylinder 20. The upper end of the support rod 50 is provided with a die head holder 55 one end of which is secured to the support rod 50 as by a screw 56 and the other end of die head holder 55 being secured to the master die 40 of the die head assembly 12 as by a screw 57.

As may be seen in FIGS. 1 and 2, the outer surface or the circumference of the die clamp 45 is provided with a plurality of teeth forming gear means 45b extending around the circumference thereof. These teeth or gear means 45b are adapted to engage the teeth on a pinion 60 which is supported on the cylinder 20 with the axes of the cylinder and pinion being parallel to each other. The pinion 60 is fixed to a shaft the lower end of which extends through the support 62, FIGS. 1 and 2, where it is engaged by a ratchet wrench 64. The ratchet wrench 64 may be of conventional type having a latch 65, FIG. 3, for reversing the position of the pawl within the ratchet depending upon the direction of rotation required, i.e. the direction required to tighten or loosen the threads.

The ratchet 64 is connected by means of a tie rod 66 to the clevis 67 which in turn is carried by the piston rod 68 of air cylinder 69. The air cylinder 69 is provided with a pair of hoses 70 and 71 which are also connected to a four way valve 72 schematically illustrated in FIG. 3. The valve 72 has been illustrated as spring centered to a neutral or off position. Air pressure from a suitable source such for example, as a pump P is supplied through a relief valve 73 to the valve 72. When the handle of 72a of valve 72 is moved to one position it will cause air to pass through the line 71 forcing the piston rod 68 out of the cylinder 69 and moving the tie rod 66 in a counter-clockwise direction as illustrated by the full line arrow in FIG. 3. When the handle 72a of valve 72 is moved to the other position it will cause the air to pass through the line 70 causing the piston rod 68 to be retracted into the cylinder 69 and moving the tie rod 66 in reverse of clockwise direction. This movement of the valve handle 72a is repeated until the desired tightening or loosening of the die clamp 45 has been accomplished. By controlling the setting of the relief valve 73 it is possible to control the maximum force applied to the ratchet lever 66 by the air cylinder 69 and this in turn controls the maximum tightening pressure on the die clamp 45.

Figure 3:
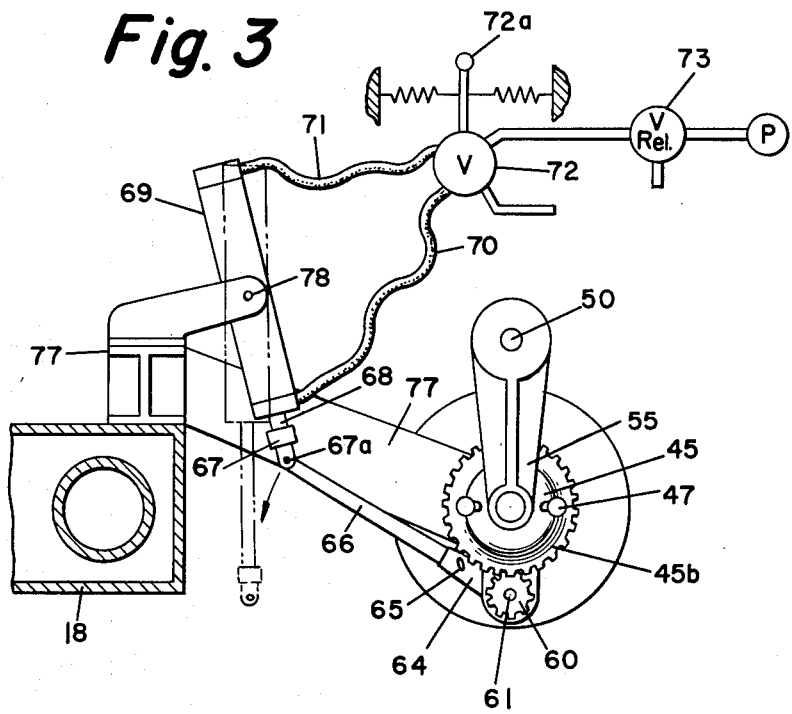
FIG. 3 is a plan view of the die locking assembly taken along the lines 3—3 in FIG. 1.

As may be seen in FIGS. 1 and 3, the air cylinder 69 is supported in a horizontal position by means of a clamp or bracket 77. The bracket 77 may be secured to the side of the cylinder 20, or to the furnace housing 18, or to both. The bracket 77 is so constructed as to support the air cylinder 69, for pivotal movement relative to pivot 78. Thus as the handle 72a of valve 72 is actuated, the cylinder 69 pivots about the pivot 78 thereby permitting the clevis 67 to move along a circular arc the radius of which, as shown in FIG. 3, corresponds to the distance between the clevis pin 67a and the axis of pinion 60.

It will be assumed now that an extruding operation has been completed and it is desired to open the die and raise the die head assembly 12 with respect to the cylinder assembly 11. The pawl 65 on the ratchet wrench 64 is adjusted in the proper direction to loosen the threads on the die head clamp 45 relative to the threads on the cylinder 20. The handle 72a of valve 72 is actuated through the required number of cycles until the die clamp 45 is loosened sufficiently so that the remaining loosening of the die clamp 45 required to separate it from the cylinder 20 can be accomplished by the manually operated handles 47. The die head assembly 12 is then raised to a predetermined position above the cylinder assembly 11. This is accomplished by actuating a valve 80, FIG. 1, which controls the pressure to the pressure cylinder 51, FIG. 2. This causes the support rod 50 to move upwardly thus raising the die head assembly 12 to the upper phantom line position shown in FIG. 1.

After the cylinder assembly 11 has been recharged with a new preform, the die head assembly 12 is then ready to be lowered and guided into alignment with the guide ring 49 of the cylinder assembly. This is accomplished by the power operated support rod 50. When the threads 45a on the die clamp 45 engage the threads 20a on cylinder 20 the initial tightening operation is performed manually by means of the handles 47. Upon tightening of the die head assembly 12, the thrust bearing 46 between the master die 40 and die clamp 45 absorbs the thrust load and permits the tightening to progress without rotation of the master die 40. After the preliminary tightening has been completed by means of the handles 47, the final tightening is accomplished by the power operated ratchet means 64 which operates through pinion 60 and gear teeth 45b to rotate the die clamp 45 relative to the cylinder 20. While air cylinders have been illustrated for operating the die clamping assembly it is to be understood that other suitable power means may be utilized including electric or hydraulic motors to expedite the final tightening or loosening of the die head assembly. Similar equivalent power arrangements may be utilized for raising or lowering the die head assembly.

Figure 4:
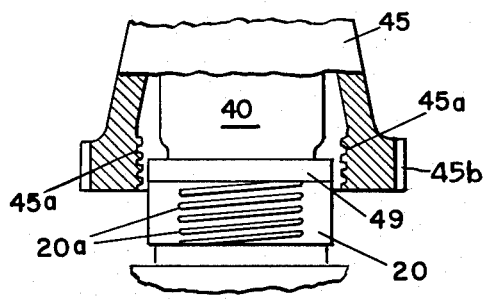
FIG. 4 is a fractional view of the threaded areas on the die clamp and cylinder.
Figure 5:
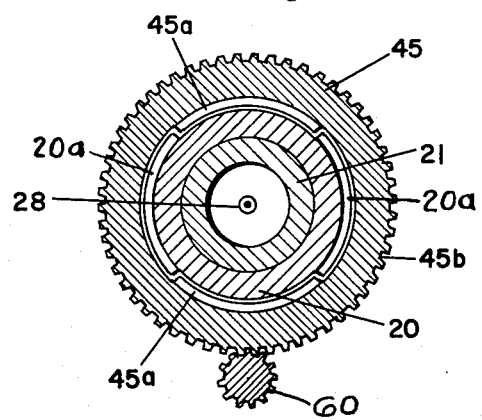
FIG. 5 is a section along the lines 5—5 in FIG. 4.

The threaded area 45a on the die clamp 45 and the corresponding threaded area 20a on the cylinder 20 may be of the continuous spiral type or they may be of the interrupted type as shown in FIGS. 4 and 5. As shown in FIGS. 4 and 5, each of the threaded areas has an angular extent of not over 90° and thus the die clamp 45 may be quickly clamped or unclamped with respect to the cylinder 20 by rotation of the die clamp 45 relative to the cylinder 20 less than a full turn.

While a preferred form of the invention has been described and illustrated it is to be understood that the invention is not limited to this particular form and that other modifications thereof may be made within the scope of the appended claims.

What is claimed is:

1. A system for clamping the die of extrusion equipment comprising cylinder means adapted to receive the material to be extruded, die head means, the interior of said die head means and the exterior of said cylinder means having threaded areas adapted for engagement with each other, handle means on said die head means for manually tightening said thread of said die head means with respect to said threads of said cylinder means, gear means disposed on the outer circumference of said die head means opposite said threaded area and spaced from said handle means, shaft means supported on said cylinder means, pinion means on one end of said shaft means, said pinion means having teeth adapted for engagement with the teeth of said gear means, and ratchet means connected to the other end of said pinion shaft means remote from said pinion means for rotation of said pinion means to drive said gear means in reverse directions as required to finally tighten said die head means with respect to said cylinder means and to initially loosen said die head means with respect to said cylinder means.

2. A system for clamping the die of extrusion equipment according to claim 1 wherein said ratchet means is connected to a piston rod of an air cylinder, means carried by said first-named cylinder means for supporting said air cylinder for pivotal movement, a pneumatic circuit for said air cylinder, and valve means in said pneumatic circuit for controlling the reciprocation of said piston rod in said air cylinder to actuate said ratchet means.

3. A system for clamping the die of extrusion equipment according to claim 1 including reciprocable means carried by said cylinder means and connected to said die head means, and means for actuating said reciprocable means to move said die head means axially relative to said cylinder means preparatory to clamping and subsequent to unclamping of the die of the extrusion equipment.

4. A system for clamping the die of extrusion equipment comprising cylinder means adapted to receive the material to be extruded, die head means, said die head means and said cylinder means having threaded areas adapted for engagement of each other, gear means disposed on the outer circumference of said die head means adjacent said threaded areas, shaft means supported on said cylinder means, pinion means on one end of said shaft means, said pinion means having teeth adapted for engagement with the teeth of said gear means, drive means connected to the other end of said shaft means remote of said pinion means for rotation of said pinion means to drive said gear means in reverse directions as required to finally tighten said die head means with respect to said cylinder means and to initially loosen said die head means with respect to said cylinder means, reciprocable means carried by said cylinder means and connected to said die head means, and means for actuating said reciprocable means to move said die head means axially relative to said cylinder means preparatory to clamping and subsequent to unclamping of the die of the extrusion equipment.

5. A system for clamping the die of extrusion equipment according to claim 4 wherein said drive means comprises reversible ratchet means connected to said pinion and power means for operating said ratchet means.

6. A system for clamping the die of extrusion equipment according to claim 4 wherein said threaded areas on said die head means and said cylinder means are interrupted so that they are movable into and out of interlocking engagement by relative rotation of less than one turn.

7. A system for clamping the die of extrusion equipment comprising cylinder means adapted to receive the material to be extruded, die head means, means supporting said die head means for raising and lowering said die head means relative to said cylinder means, the interior of said die head means and the exterior of said cylinder means having threaded areas adapted for engagement with each other, gear means disposed on the outer circumference of said die head means adjacent said threaded areas, pinion means supported on said cylinder means, said pinion means having teeth adapted for engagement with the teeth of said gear means, drive means connected to said pinion means for rotation of said pinion means to drive said gear means in reverse direction as required to finally tighten said die head means with respect to said cylinder means and to initially loosen said die head means with respect to said cylinder means, and a master die supported within said die head means relative to a thrust bearing whereby said thrust bearing absorbs the thrust load and permits the tightening and loosening to progress without rotation of said master die.

8. A system for clamping the die of extrusion equipment according to claim 2 wherein said pneumatic circuit includes a relief valve to control the maximum force applied to said ratchet means by said air cylinder so as to control the maximum tightening pressure of said die head means.

9. A system for clamping the die of extrusion equipment according to claim 2 wherein said valve means in said pneumatic circuit comprises a four-way valve having a pair of hoses connected thereto, said valve being spring-centered to a neutral position.

References Cited by the Examiner

UNITED STATES PATENTS

| | | | |
|---|---|---|---|
| 1,577,015 | 3/26 | Glaze | 18—12 |
| 1,947,202 | 2/34 | Homeier | 18—12 |
| 2,499,625 | 9/48 | Stuart | 18—12 |
| 2,683,897 | 7/54 | Patterson | 18—12 |
| 2,803,851 | 8/57 | Baunlich et al. | 18—12 |
| 2,923,972 | 2/60 | De Ghetto | 18—12 |

FOREIGN PATENTS 415,674  10/46  Italy.

WILLIAM J. STEPHENSON, *Primary Examiner.*